United States Patent
Sasaki et al.

(10) Patent No.: US 9,928,304 B2
(45) Date of Patent: Mar. 27, 2018

(54) INFORMATION-PROCESSING DEVICE, STORAGE MEDIUM, INFORMATION-PROCESSING SYSTEM, AND INFORMATION-PROCESSING METHOD

(71) Applicant: NINTENDO CO., LTD., Kyoto (JP)

(72) Inventors: Tetsuya Sasaki, Kyoto (JP); Munetaka Tsuda, Kyoto (JP); Yasuto Kakimoto, Kyoto (JP); Ryoma Aoki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 389 days.

(21) Appl. No.: 13/783,855

(22) Filed: Mar. 4, 2013

(65) Prior Publication Data

US 2014/0137040 A1 May 15, 2014

(30) Foreign Application Priority Data

Nov. 15, 2012 (JP) .................................. 2012-251436

(51) Int. Cl.
*G06F 17/30* (2006.01)

(52) U.S. Cl.
CPC .. *G06F 17/30884* (2013.01); *G06F 17/30876* (2013.01)

(58) Field of Classification Search
CPC ................................................ G06F 17/30884
See application file for complete search history.

(56) References Cited

U.S. PATENT DOCUMENTS

| | | | | |
|---|---|---|---|---|
| 8,689,111 | B1* | 4/2014 | Leblang | G06F 17/30887 715/745 |
| 2002/0052934 | A1* | 5/2002 | Doherty | G06F 17/30873 709/219 |
| 2003/0009521 | A1* | 1/2003 | Cragun | G06F 17/30884 709/205 |
| 2003/0080986 | A1* | 5/2003 | Baird | G06F 17/30884 715/700 |
| 2004/0148340 | A1* | 7/2004 | Cotte | H04L 29/06027 709/203 |
| 2005/0149511 | A1* | 7/2005 | Ruthfield et al. | 707/3 |
| 2005/0267869 | A1* | 12/2005 | Horvitz et al. | 707/2 |

(Continued)

FOREIGN PATENT DOCUMENTS

JP 2007-328478 12/2007

OTHER PUBLICATIONS

Understanding Symbolic Links—http://www.nixtutor.com/freebsd/understanding-symbolic-links/ (available as of Jun. 5, 2009).*

*Primary Examiner* — William Bashore
*Assistant Examiner* — Nathan Shrewsbury
(74) *Attorney, Agent, or Firm* — Nixon & Vanderhye, P.C.

(57) ABSTRACT

An example information-processing device that includes: a first registering unit that registers, in accordance with an operation performed by a user, a link data set indicating a specific data set, a specifying unit that specifies a status of use of a link data set registered by the first registering unit or a status of use of a specific data set indicated by a link data set registered by the first registering unit, and a second registering unit that registers at least one of a plurality of link data sets registered by the first registering unit based on a status of use specified by the specifying unit.

19 Claims, 6 Drawing Sheets

(56) References Cited

U.S. PATENT DOCUMENTS

| | | | |
|---|---|---|---|
| 2007/0033275 A1* | 2/2007 | Toivonen | G06F 17/30884 709/224 |
| 2007/0043745 A1* | 2/2007 | Rojer | 707/100 |
| 2007/0233692 A1* | 10/2007 | Lisa | G06F 17/30651 |
| 2008/0288492 A1* | 11/2008 | Gemmell et al. | 707/7 |
| 2009/0037355 A1* | 2/2009 | Brave et al. | 706/45 |
| 2009/0164903 A1* | 6/2009 | Patel | 715/721 |
| 2009/0249218 A1* | 10/2009 | Hamaoui et al. | 715/745 |
| 2009/0254586 A1* | 10/2009 | Barrett | 707/104.1 |
| 2009/0287657 A1* | 11/2009 | Bennett | 707/3 |
| 2010/0169756 A1* | 7/2010 | Bonchi et al. | 715/206 |
| 2011/0035264 A1* | 2/2011 | Zaloom | 705/14.12 |
| 2011/0087966 A1* | 4/2011 | Leviathan | 715/745 |
| 2011/0258216 A1* | 10/2011 | Supakkul et al. | 707/769 |
| 2011/0276889 A1* | 11/2011 | Boshernitzan | G06F 17/30884 715/738 |
| 2012/0109945 A1* | 5/2012 | Lapko | G06F 17/30905 707/723 |
| 2012/0297318 A1* | 11/2012 | Amrhein | G06F 17/30873 715/753 |
| 2013/0073388 A1* | 3/2013 | Heath | G06Q 30/02 705/14.53 |
| 2013/0159314 A1* | 6/2013 | Kao | G06F 17/30884 707/740 |
| 2014/0019267 A1* | 1/2014 | Stoliartchouk | G06Q 30/0277 705/14.73 |

\* cited by examiner

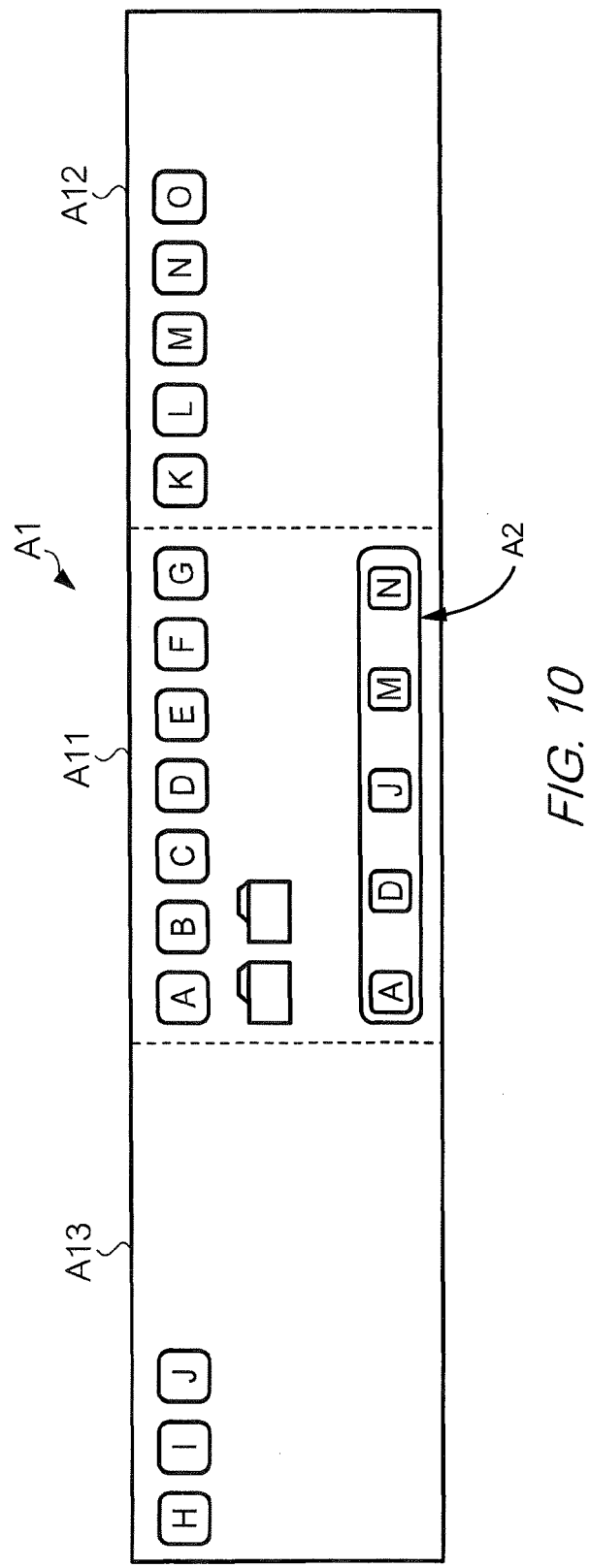

INFORMATION-PROCESSING DEVICE, STORAGE MEDIUM, INFORMATION-PROCESSING SYSTEM, AND INFORMATION-PROCESSING METHOD

CROSS REFERENCE TO RELATED APPLICATIONS

This application is based on and claims priorities under 35 USC 119 from Japanese patent application No. 2012-251436, which was filed on Nov. 15, 2012.

FIELD

The technology herein relates to accessing data sets.

BACKGROUND AND SUMMARY

A technology is known for facilitating access by a user of specific web pages that the user accesses frequently.

The present disclosure provides an information-processing device that comprises a first registering unit that registers, in accordance with an operation performed by a user, a link data set indicating a specific data set, a specifying unit that specifies a status of use of a link data set registered by the first registering unit or a status of use of a specific data set indicated by a link data set registered by the first registering unit, and a second registering unit that registers at least one of a plurality of link data sets registered by the first registering unit based on a status of use specified by the specifying unit.

BRIEF DESCRIPTION OF THE DRAWINGS

Exemplary embodiments will now be described with reference to the following drawings, wherein:

FIG. 10 shows an example of a screen according to an exemplary embodiment.

DETAILED DESCRIPTION OF NON-LIMITING EXEMPLARY EMBODIMENTS

1. Overview

One of the technical features of the exemplary embodiments is to register in two stages link data sets identifying specific data sets. In this description, the term "register" means to enter a data set in a list that is used for displaying specific screens. The list may be, for example, a bookmark list, commonly referred to as "favorites." The link data sets may identify specific data sets stored in networks or in a local storage medium.

In the exemplary embodiments, registration in the first stage is executed in accordance with an operation performed by a user. The user selects, from among plural candidate data sets, one or more data sets that s/he wishes to access quickly, and registers the selected data sets in the first list. On the other hand, registration of data sets in the second stage is executed based on a status of actual use by the user of data sets or link data sets identifying the data sets, and link data sets to be displayed in the second list are limited. Namely, registration in the second stage is executed based on a status of actual use by the user of the data sets or the link data sets identifying the data sets, and on the result of registration in the first stage. For example, link data sets registered in the second list in the second stage are link data sets that are registered in the first list and frequently used by the user.

Figure 1:
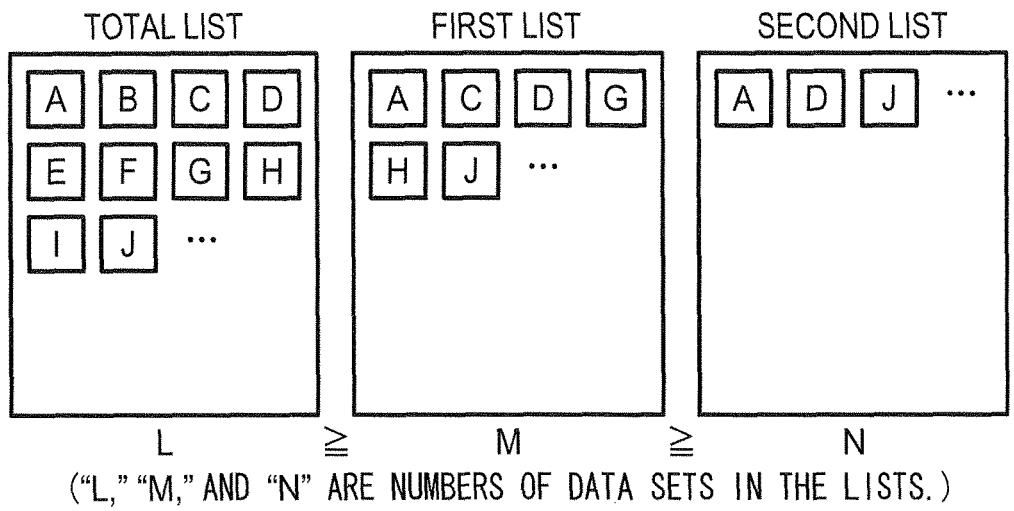
FIG. 1 shows an example non-limiting relationship between data sets and lists according to an exemplary embodiment.

FIG. 1 shows an example of a relationship between data sets and the lists according to an exemplary embodiment. In the example shown in FIG. 1, a number of total link data sets that the user can use is "L," a number of link data sets that are registered in the first list is "M," and a number of link data sets that are registered in the second list is "N." These numbers meet a condition of "L"≥"M"≥"N," and typically "L">"M">"N." Link data sets in the second list are selected from the first list. Namely, link data sets in the second list are also found in the first list. In other words, any link data set that is not contained in the first list cannot be contained in the second list.

Accordingly, unintended registration of a link data set in the first or second list is avoided. For example, if registration of link data sets is based only on a status of use of the link data sets, a list may contain link data sets frequently used by the user but that s/he does not wish to register in either of the first list or the second list. Typical examples of such link data sets would include a link data set indicating privacy of a user and a link data set indicating interests or favorites of the user that s/he wishes to keep confidential; namely, data sets that the user does not wish to disclose directly or indirectly to third parties. By this exemplary embodiment protection of privacy of a user is enhanced.

Figure 2:
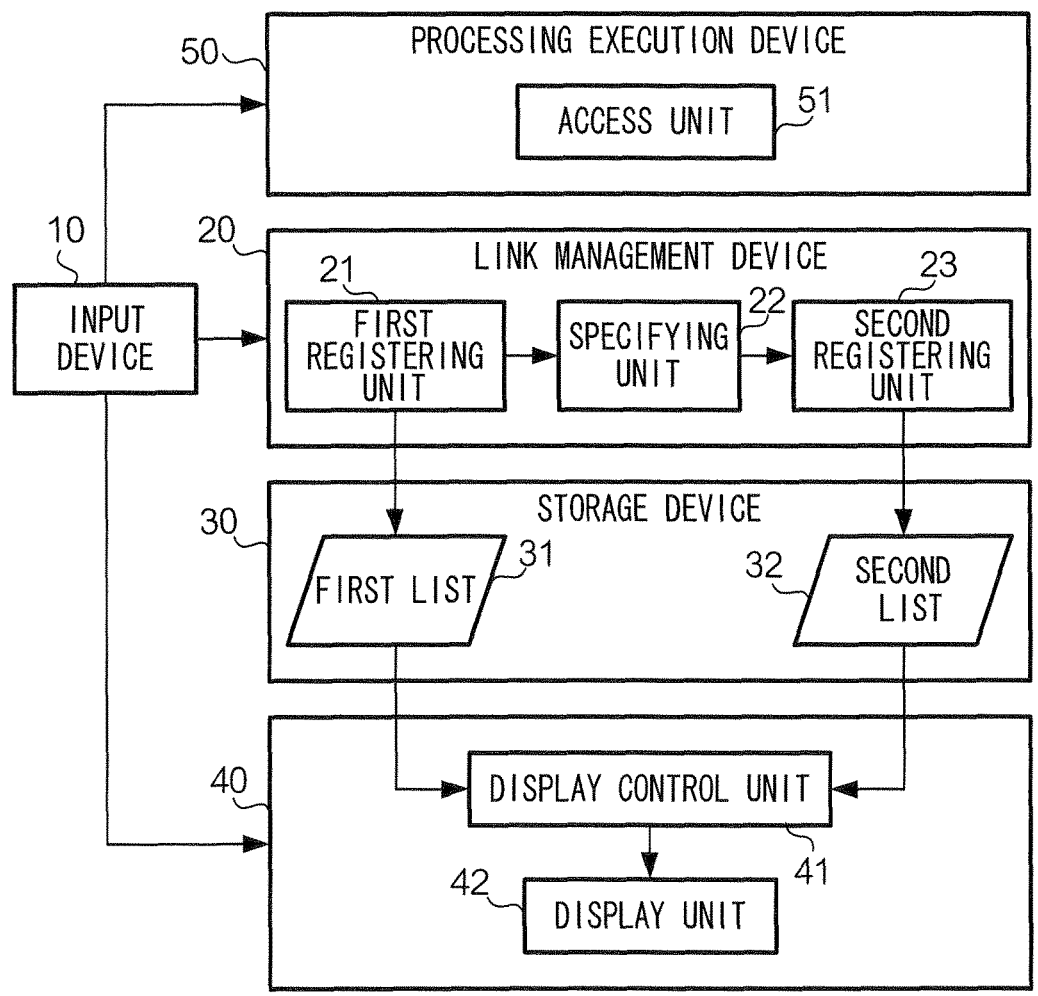
FIG. 2 shows an example non-limiting functional configuration of a system according to an exemplary embodiment.

FIG. 2 shows an example of a functional configuration of a system according to an exemplary embodiment. The system shown in FIG. 2 includes input device 10, link management device 20, storage device 30, display device 40, and processing execution device 50. In FIG. 2, for convenience of description the devices are shown as separate from one another. However, two or more of the devices may be configured as a single device.

Input device 10 has a unit that inputs data sets indicating operations performed by a user to display control unit 41. Link management device 20 is a device that manages link data sets, and it includes first registering unit 21, specifying unit 22, and second registering unit 23. Storage device 30 has a unit that stores first list 31 and second list 32. Display device 40 has display control unit 41 and display unit 42. Processing execution device 50 is a device that executes processing in accordance with an operation performed using input device 10, for example, an operation to select a link data set. Processing execution device 50 includes access unit 51.

First registering unit 21 is a first unit that registers link data sets. First registering unit 21 registers specific link data sets among candidate link data sets in accordance with operations performed by the user. The operations performed by the user for registering specific link data sets are referred to as "registration operations" in the following description. First registering unit 21 registers link data sets in first list 31.

First registering unit 21 may further have a function for editing link data sets, either before or after they are registered in first list 31, in accordance with operations performed by the user. In this description, the term "edit" means to modify information on link data sets or to delete link data sets from the list. Moreover, first registering unit 21 may change the style of appearance of first list 31 such as an order of link data sets when first list 31 is displayed. Namely, first registering unit 21 may be configured to edit either link data sets in first list 31 or to edit actual first list 31.

Specifying unit 22 specifies statuses of use of link data sets registered in first list 31 or data sets identified by the link data sets. In this description, the term "status of use" means a way in which the user has used a link data set or a data set identified by the link data set. For example, a status of use of a link data set or a data set identified by the link data set is specified based on a number of uses of the data set. Specifying unit 22 may specify a status of use of data sets based on a criterion other than a number of uses, such as durations of use of link data sets or data sets identified by the data sets in combination with the number of uses.

Second registering unit 23 is a second unit that registers link data sets. Second registering unit 23 registers in second list 32 a particular number of link data sets selected from among link data sets registered in first list 31. Second registering unit 23 determines to register link data sets based on a status of use of the link data sets specified by specifying unit 22. For example, second registering unit 23 registers link data sets in second list 32 in a descending order of numbers of uses of the link data sets. Second registering unit 23 orders link data sets based on a status of use of the link data sets specified by specifying unit 22, and determines which link data sets are displayed and in what style the link data sets are displayed, such as a display order, based on the order of the link data sets.

Display control unit 41 controls display performed by display unit 42. Display control unit 41 controls at least displays of first list 31 and second list 32, and it may additionally control display of other graphics. Display unit 42 displays a graphic showing first list 31 and/or second list 32.

Access unit 51 accesses data sets in accordance with link data sets. Access unit 51 refers to data sets identified by link data sets registered in first list 31 or second list 32 by first registering unit 21 or second registering unit 23 in accordance with operations performed by the user. Access unit 51 may access both data sets stored in a network and data sets stored in a local storage medium.

2. Exemplary Embodiments 2-1: First Exemplary Embodiment

Figure 3:
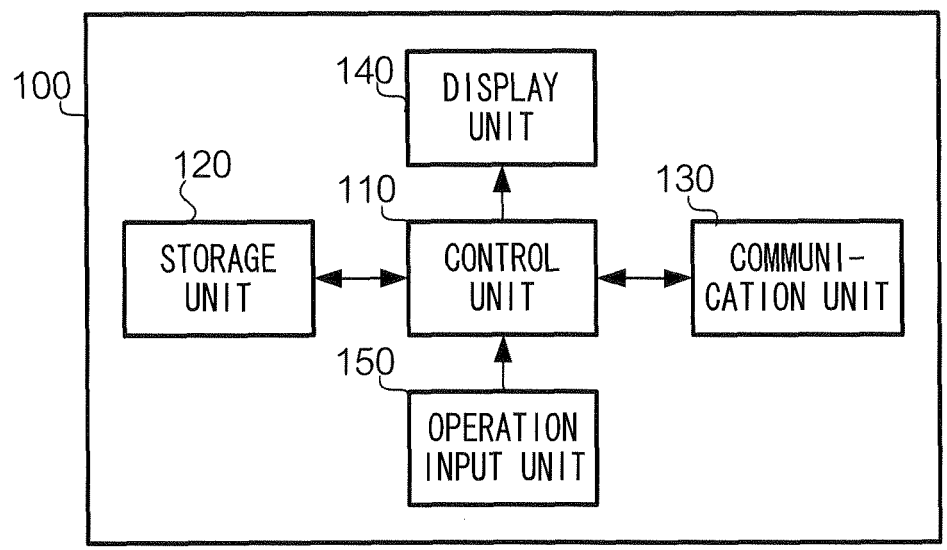
FIG. 3 shows an example non-limiting hardware configuration of an information-processing device according to an exemplary embodiment.

FIG. 3 shows a hardware configuration of information-processing device 100 according to an exemplary embodiment. According to the exemplary embodiment, information-processing device 100 is, for example, a handy gaming machine, i.e. a gaming machine that is small enough for a user to hold and operate. Information-processing device 100 has control unit 110, storage unit 120, communication unit 130, display unit 140, and operation input unit 150.

Control unit 110 controls processing executed by each unit of information-processing device 100. Control unit 110 has an arithmetic processing unit such as a CPU (Central Processing Unit) and a memory, and executes data processing following instructions of a particular computer program to control the other units of information-processing device 100. Storage unit 120 stores data sets. Storage unit 120 has a recording medium such as a hard disk and a flash memory, and stores data used by control unit 110. Storage unit 120 stores access log data indicating timings of use of link data sets and/or numbers of uses of link data sets, bookmarks (explained later), evaluation values (explained later), etc., as well as an application program for realizing a function of a web browser. Communication unit 130 transmits data to an external device and receives data from the external device. Communication unit 130 connects to a computer network such as the Internet or LAN (Local Area Network) and/or an information-processing device, and exchanges data with the computer network and/or the other information-processing device.

Display unit 140 displays graphics. Display unit 140 has, for example, a display panel with liquid crystal elements or organic EL (electroluminescence) elements and a circuit to drive the display panel, and displays a graphic in accordance with a display data set provided by control unit 110. Operation input unit 150 receives operations performed by a user. Operation input unit 150 has, for example, keys or buttons such as direction keys or arrow keys, and provides control unit 110 with operation data sets indicating operations performed by the user. For example, an operation data set may indicate a current status of a specific key, such as whether the key is held down or not.

Keys of operation input unit 150 are not limited to physical keys, and operation input unit 150 may be a touch sensor such as a touch screen covering the display area of display unit 140. Operation input unit 150 may remotely provide control unit 110 with operation data sets, similarly to a remote controller. Moreover, operation input unit 150 may have one or more sensors such as an infrared sensor and a motion sensor such as a gyroscope and an acceleration sensor.

Information-processing device 100 according to the exemplary embodiment has input device 10, link management device 20, storage device 30, display device 40, and processing execution device 50, as explained above. Control unit 110 realizes the functions of first registering unit 21, specifying unit 22, second registering unit 23, display control unit 41, and processing execution device 50. Storage unit 120 is an example of storage device 30, display unit 140 is an example of display unit 42, and operation input unit 150 is an example of input device 10.

Information-processing device 100 is configured as described above. By the configuration, information-processing device 100 displays graphics in accordance with an operation performed by the user. In the exemplary embodiment, information-processing device 100 has a function to display web pages, i.e. a function of a web browser, and it is able to display a list of bookmarks Information-processing device 100 is able to display bookmarks of the first group and bookmarks of the second group. A bookmark is an example of a link data set. Namely, a link data set may be a hyperlink indicating a URL (Uniform Resource Locator). In the following examples, data sets identified by link data sets are data sets instructing display of web pages, and they are stored by external devices accessed by information-processing device 100 and obtained by information-processing device 100 via computer networks.

Bookmarks of the first group are URLs that the user registered as link data sets. Bookmarks of the first group may be edited and updated in accordance with operations performed by the user. On the other hand, bookmarks of the second group are generated by information-processing device 100. Bookmarks of the second group are generated based on link data sets registered as bookmarks of the first group, and updated at certain timings such as certain times of day or at each time the user uses any one of bookmarks of the first group. Bookmarks of the first group are examples of data sets in the first list, and bookmarks of the second group are examples of data sets in the second list.

Figure 4:
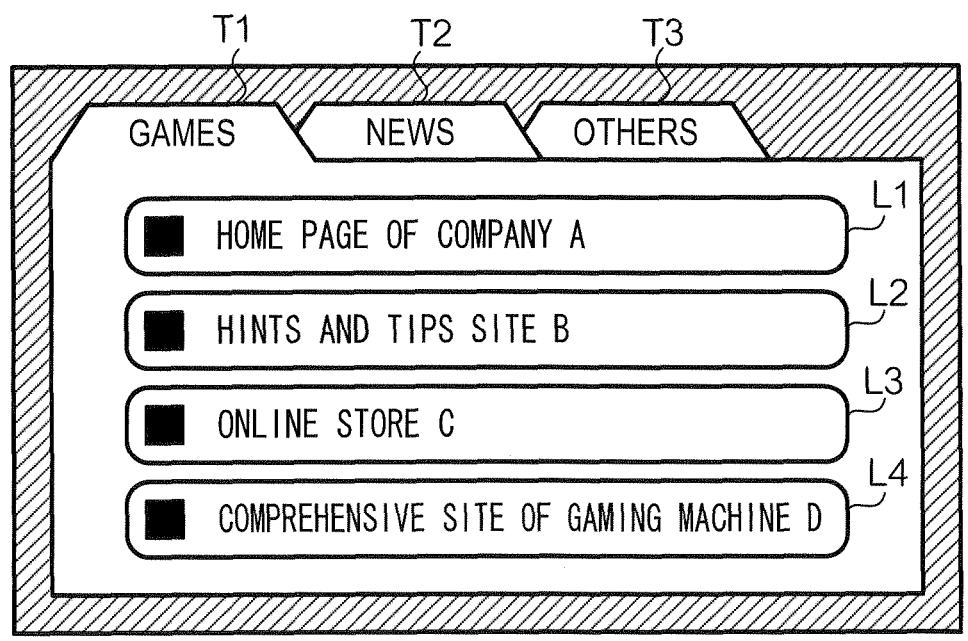
FIG. 4 shows an example non-limiting first bookmark according to an exemplary embodiment.

FIG. 4 shows examples of bookmarks of the first group. Bookmarks of the first group include at least link data sets L1, L2, L3 and L4. Bookmarks of the first group are categorized into one of three groups corresponding to tabs T1, T2 and T3 respectively. In the example shown in FIG. 4, all of link data sets L1 to L4 are categorized into the group corresponding to tab T1, i.e. the category of "Games."

Each of link data sets L1 to L4 is related to a URL of a particular web page. When any one of the link data sets is selected by the user, information-processing device 100 downloads a data set of a web page identified by the selected link data set, and displays the web page. A data set of a web page may be, for example, a data set described in HTML (HyperText Markup Language) indicating text and graphics to be shown in a web page, a graphic data set, or a data set indicating scripts such as JavaScript. In FIG. 4, titles of web pages identified by link data sets L1 to L4 are displayed.

Figure 5:
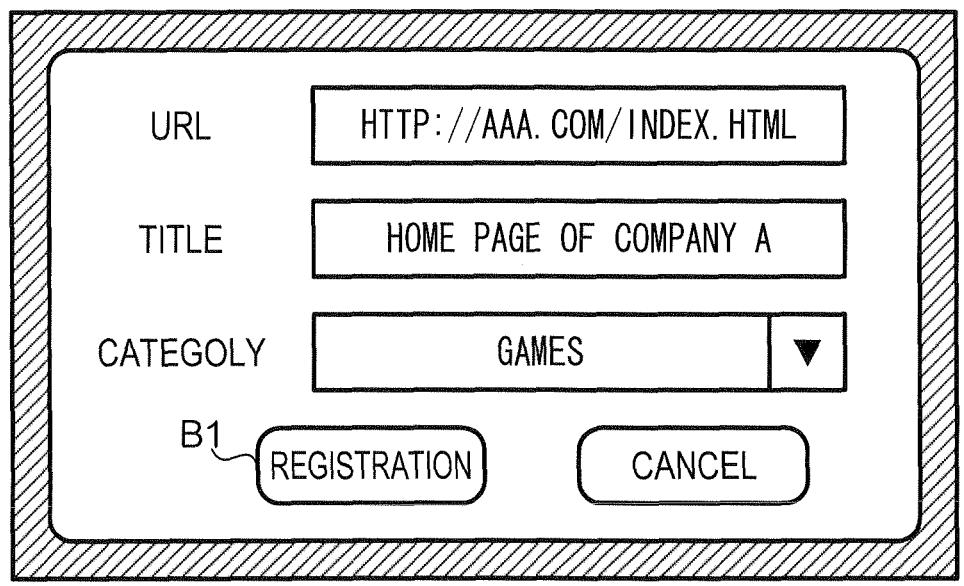
FIG. 5 shows an example non-limiting screen for registering links of first bookmarks.

FIG. 5 shows an example of a screen for registering link data sets as bookmarks of the first group. When the user finds a particular web page that he/she wishes to register while using the Internet, s/he performs a particular operation to cause information-processing device 100 to display the screen for registering link data sets. In the screen for registering link data sets, default URL, title, and category are shown. The default URL is, for example, a URL of a web page that information-processing device 100 displayed when the user performed the operation for registration. The default title is, for example, the title given to the web page such as a text string of a title element described in an HTML data set of the web page. The default category is, for example, a fixed category that is set to information-processing device 100.

In the screen for registration, the user may edit the URL, title and category if necessary. The user may modify the URL, rewrite the title for ease of recognition, etc. The category may be selected, for example, from a list of candidate categories shown in a pulldown menu. It is also possible for the user to add a new category to the candidate categories. When the user performs an operation for holding down registration button B1, information-processing device 100 generates a link data set indicating the URL, title and category of a web page that is currently displayed, and registers the link data set as a bookmark of the first group. In the following explanation, the series of operations from the operation for displaying a web page to the operation for holding down registration button B1 is referred to as a registration operation.

The information indicated by the link data set such as the URL, title and category may be edited either at the time of registration of the link data set or after registration of the link data set. The display order of bookmarks of the first group may also be edited either at the time of the registration or after the registration. Moreover, the link data set may be deleted after it is registered.

Figure 6:
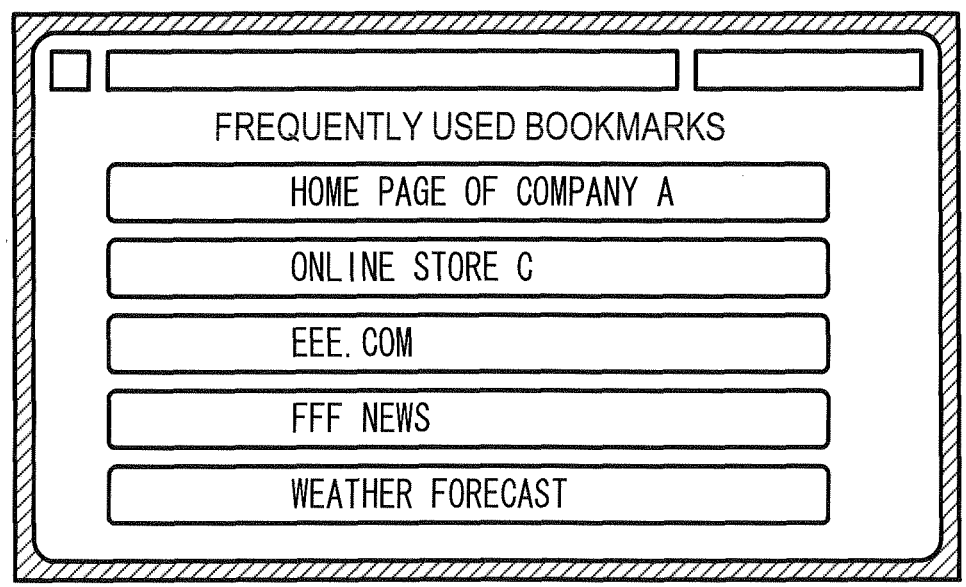
FIG. 6 shows an example non-limiting second bookmark according to an exemplary embodiment.

FIG. 6 shows examples of bookmarks of the second group. Bookmarks of the second group are, for example, shown as a start page when the user starts a web browser or displays a new web page. Accordingly, the user does not need to perform an operation for displaying bookmarks of the second group after a start page is displayed.

Link data sets to be registered as bookmarks of the second group are selected from among link data sets registered as bookmarks of the first group. Namely, link data sets displayed as bookmarks of the second group are also included in bookmarks of the first group. Namely, link data sets displayed as bookmarks of the second group do not include any link data set that is not registered as a bookmark of the first group.

Figure 7:
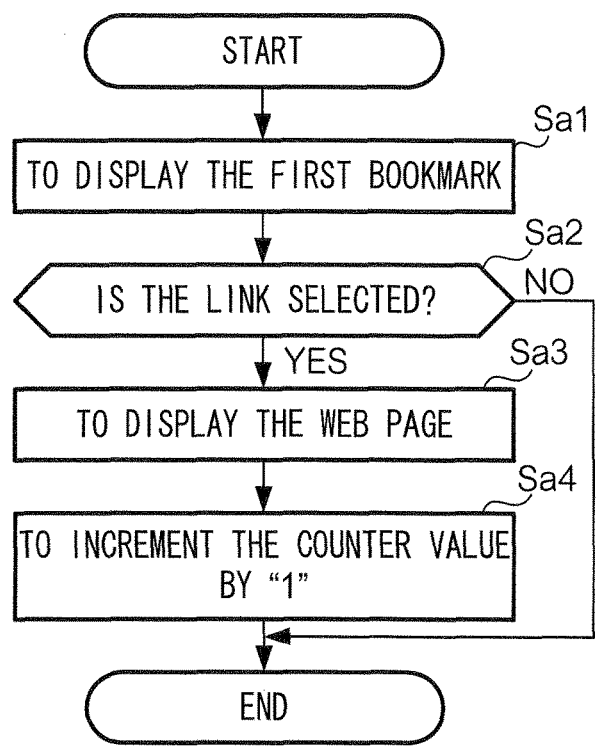
FIG. 7 shows an example non-limiting flowchart of processing executed for selecting a link from among first bookmarks according to an exemplary embodiment.

FIG. 7 shows an example of a non-limiting flowchart of processing executed to select a link data set from among bookmarks of the first group. First, control unit 110 of information-processing device 100 causes display unit 140 to display bookmarks of the first group in accordance with an operation of the user (step Sa1). Next, control unit 110 judges whether any one of link data sets included in bookmarks of the first group is selected by the user or not (step Sa2). If none of the included link data sets is selected, control unit 110 ends the series of processing.

When a link data set is selected, control unit 110 downloads a data set of a web page indentified by the selected link data set, and causes display unit 140 to display the web page (step Sa3). Then, control unit 110 increments a value indicating a number of uses of the link data set identifying the displayed web page by "1" (step Sa4). In the following explanation, the value incremented in step Sa4 is referred to as a "counter." The counter is prepared for each of link data sets registered as bookmarks of the first group, and stored by storage unit 120 together with data sets indicating timings of use of the link data set as a part of access log data set.

Figure 8:
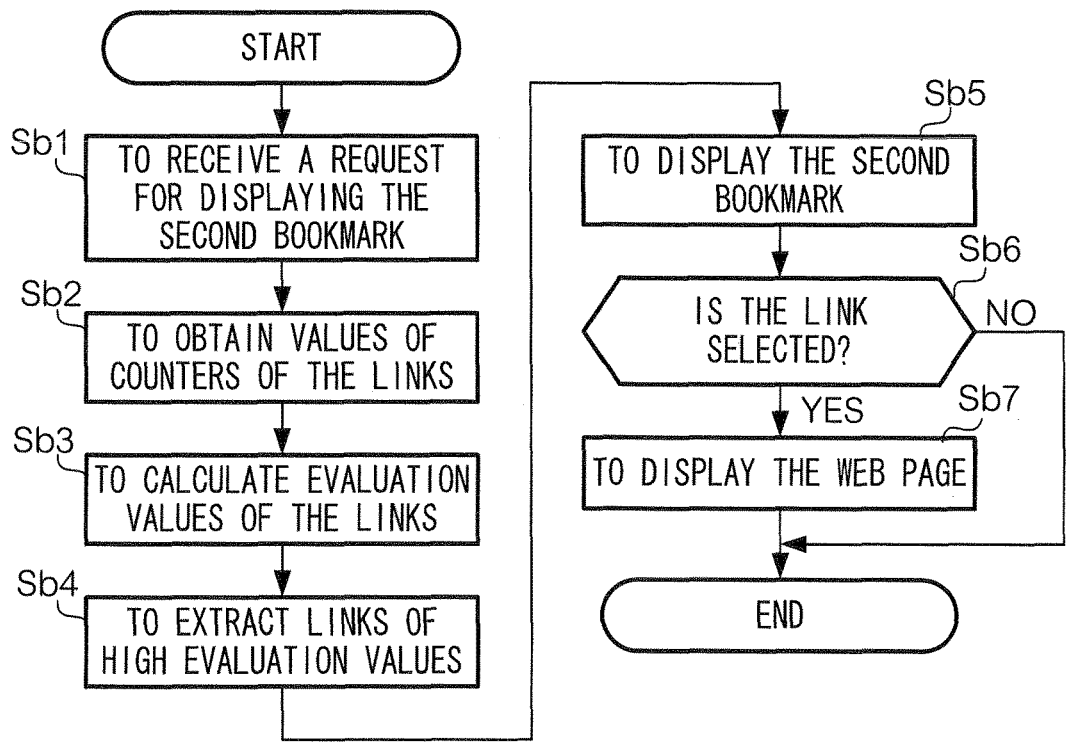
FIG. 8 shows an example non-limiting flowchart of processing executed for displaying a second bookmark according to an exemplary embodiment.

FIG. 8 shows an example of a non-limiting flowchart of processing executed for displaying bookmarks of the second group. In the series of processing, first, control unit 110 receives a request for displaying bookmarks of the second group (step Sb1). The request is generated in accordance with an operation made by the user. Next, control unit 110 reads out counters corresponding to link data sets registered as bookmarks of the first group from storage unit 120 (step Sb2).

Next, control unit 110 calculates an evaluation value of each of the link data sets registered as bookmarks of the first group based on the counter (step Sb3). The evaluation value is, for example, calculated as "V" in formula (1) shown below when the counter is "n" and a coefficient is "c":

$$V = cn \quad (1)$$

Coefficient "c" may vary in accordance with, for example, timings of use of the link data set indicated by the access log data set. For example, coefficient "c" is determined based on the timing of receipt of the request in step Sb1 and the most recent timing of use of the link data set as follows.

If the duration between the most recent timing of use of the link data set and the timing of receipt of the request in step Sb1 is 5 days or less, c=1.0.

If the duration between the most recent timing of use of the link data set and the timing of receipt of the request in step Sb1 is between 6 days and 15 days, c=0.7.

If the duration between the most recent timing of use of the link data set and the timing of receipt of the request in step Sb1 is between 16 days and 30 days, c=0.5.

If the duration between the most recent timing of use of the link data set and the timing of receipt of the request in step Sb1 is more than 30 days, c=0.3.

Namely, the more recently the link data set was used, the larger an evaluation value that is calculated by the larger coefficient "c," and the greater the amount of time that passes after the most recent use of the link data set, the smaller the evaluation value that is calculated by the smaller coefficient "c." Accordingly, the evaluation value indicates the status of use of the link data set, i.e. when the link data set was most recently used by the user.

The values of coefficient "c" are not limited to the above-explained examples. Moreover, a constant value such as "1" may be set always as coefficient "c." In this case, the evaluation value is determined only based on the counter, and the value does not vary based on when the link data set was most recently used.

After calculating the evaluation value of each of the link data sets, control unit 110 extracts a particular number of link data sets with higher evaluation values (step Sb4). The number of extracted link data sets may be determined based on suitable parameters such as a size of a screen of information-processing device 100; with the number of extracted link data sets being at least one and typically around 5. Then, control unit 110 causes display unit 140 to display the extracted link data sets as bookmarks of the second group (step Sb5). In step Sb5, control unit 110 causes display unit 140 to display the extracted link data sets, for example, in descending order according to their evaluation values. Namely, control unit 110 causes display unit 140 to display the extracted link data sets so that a link data set frequently used over a recent period is displayed at a higher position on the screen than link data sets used less frequently over the same period.

Next, control unit 110 judges whether any one of bookmarks of the second group is selected by the user (step Sb6). If a link data set is selected, control unit 110 downloads a data set of a web page identified by the selected link data set, and causes display unit 140 to display the web page (step Sb7). On the other hand, if no link data set is selected, control unit 110 ends the series of processing without displaying a web page identified by a bookmark of the second group.

The processing of steps Sb2 to Sb4 may be executed without waiting for the request for displaying bookmarks of the second group. In this case, control unit 110 calculates the evaluation values and stores the evaluation values in its memory or storage unit 120 before it receives the request for displaying bookmarks of the second group, and when control unit 110 receives the request, it reads out the evaluation values.

As explained above, according to information-processing device 100, the user can use bookmarks of the second group selected based on a status of use of the link data sets in addition to bookmarks of the first group that are selected by the user. Bookmarks of the second group indicate link data sets that are indicated by bookmarks selected from among bookmarks of the first group.

For example, some web browsers have a function for displaying a particular number of link data sets identifying web pages accessed frequently by the user within a recent period at certain timings. Different from the link data sets displayed by the known web browsers, the bookmarks of the second group according to the exemplary embodiment do not contain any link data set that the user did not select. Therefore, in the exemplary embodiment a link data set that the user does not wish to be displayed is prevented from being displayed.

The display of information-processing device 100 may be seen by a third party depending on a way in which the user uses the device. In particular, if the bookmarks are displayed in a start page as bookmarks of the second group according to the example embodiment, a possibility of the bookmarks being seen by a third party contrary to the wishes of the user increases. If the start page shows, for example, a link data set indicating a web site for Internet banking, and the link data set is seen by a third party, the third party will gain knowledge of a bank used by the user of information-processing device 100. Moreover, for example, titles of link data sets may include information private to the user. According to the exemplary embodiment, a risk of information private to a user being disclosed to a third party is decreased.

As explained above, according to information-processing device 100, the user can use both bookmarks of the first group that are selected by the user directly and also bookmarks of the second group that are selected automatically without any operation by the user, based on a status of use of link data sets. The user may find use of bookmarks of the first group convenient since they are bookmarks that s/he freely selected based on his/her usage preferences. On the other hand, the user may find use of bookmarks of the second group convenient since they are bookmarks that s/he frequently used in a recent period. Namely, bookmarks of the first group and bookmarks of the second group have different uses from each other, while providing effects that complement each other. Accordingly, when the user uses both bookmarks of the first group and bookmarks of the second group, s/he can benefit from the advantages provided by each group of bookmarks.

If bookmarks corresponding to bookmarks of the first group are automatically modified based on a status of use of link data sets without an operation being made by the user, usability of the bookmarks may decrease. The bookmarks selected by the user normally are sorted by the user to increase their usability, as a result of which the user find and select with ease a particular bookmark after repeatedly using the bookmark. Therefore, if alignment of the bookmarks is changed without intentional input by the user, the user may carry out undesired operations or experience difficulty in making an operation quickly since an alignment of the bookmarks that is familiar to the user is lost.

2-2: Second Exemplary Embodiment

In contrast to the first exemplary embodiment explained above, in the second exemplary embodiment there is provided a technical feature that link data sets identifying application programs and user data sets stored in a local storage are displayed. A device that realizes the second exemplary embodiment may have the same hardware configuration as information-processing device 100 of the first exemplary embodiment. In the following description, features of the second exemplary embodiment that are different from those of the first exemplary embodiment are mainly explained, and features that are common between the first and second exemplary embodiments either are not explained or are explained briefly. In the following explanation, like components in the second exemplary embodiment appearing in the first exemplary embodiment are denoted in the second exemplary embodiment by like reference numerals used in the first exemplary embodiment.

In this exemplary embodiment, so-called soft links are used. In this description, soft links are links referring to files or directories stored in a local storage area, i.e. storage unit 120 in this exemplary embodiment, such as shortcuts, aliases, and symbolic links. In this exemplary embodiment, if information-processing device 100 can directly access files or directories stored in an external storage device, links used in this exemplary embodiment may include links referring to the files or directories stored in the external storage device.

Figure 9:
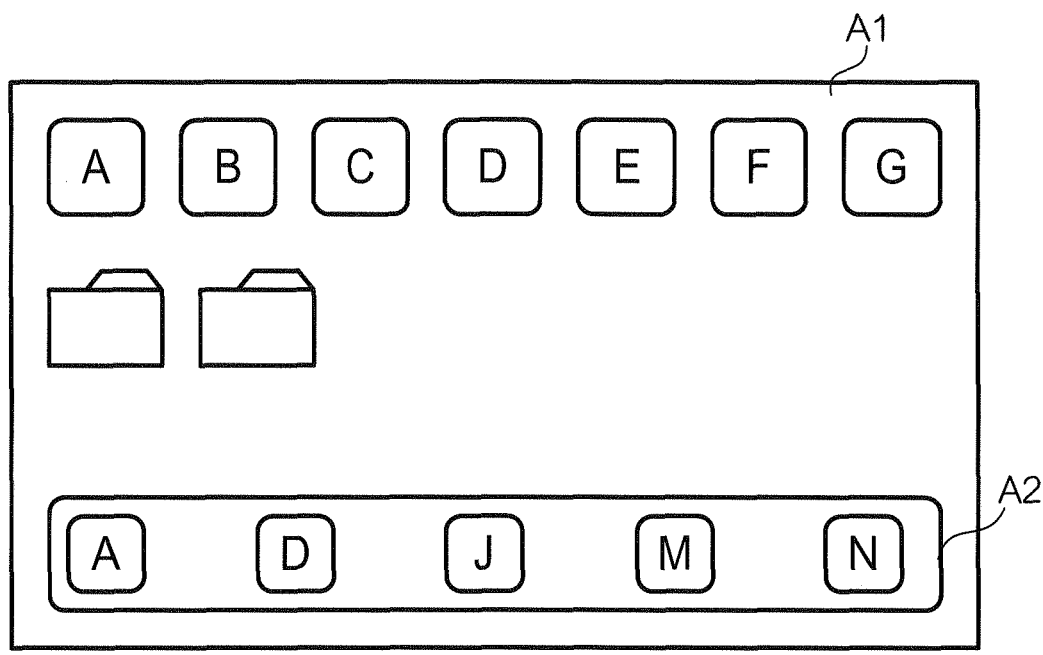
FIG. 9 shows an example of a screen according to an exemplary embodiment.

FIG. 9 shows an example of a screen according to this exemplary embodiment. Information-processing device 100 displays some objects in first area A1 on the screen, and other objects in second area A2 on the screen. First area A1 is an area for aligning icons of link data sets identifying application programs that are installed in information-processing device 100 and frequently used by the user. The icons in first area A1 are selected and aligned by the user. In first area A1, folders may also be aligned. In this description, a folder may contain one or more icons of link data sets. On the other hand, second area A2 is an area for aligning icons of link data sets that are selected from among the icons of link data sets in first area A1 based on a condition of a status of use of the link data sets. First area A1 is an example of a first list, and second area A2 is an example of a second list.

First area A1 is not limited to a single page, and may contain plural pages. FIG. 10 shows an example of first area A1 containing plural pages. In this case, first area A1 contains first page A11, second page A12, and third page A13. For example, while information-processing device 100 displays first page A11, if the user scrolls the screen in the left direction, second page A12 is displayed, and if the user scrolls the screen in the right direction, third page A13 is displayed. In this case, information-processing device 100 may display second area A2 at the same position on the screen while first area A1 is scrolled and moved on the screen.

The above-explained display control according to this exemplary embodiment may be realized by an OS (Operating System), an application program such as a launch program, etc. Display of first area A1 and display of second area A2 may be controlled by different programs respectively.

Many operations of information-processing device 100 of this exemplary embodiment are the same as the operations of information-processing device 100 of the first exemplary embodiment. However, in this exemplary embodiment, when the user selects an icon, information-processing device 100 executes an application program identified by the selected icon or accesses a data set identified by the selected icon instead of displaying a web page performed in steps Sa3 and Sb7 in the first exemplary embodiment. Namely, use of data set in this exemplary embodiment results in access to a data set or execution of a program. Information-processing device 100 may always display second area A2 on the screen, although bookmarks of the second group are displayed only after information-processing device 100 receives a request from the user as explained in the first exemplary embodiment (step Sb1).

According to this exemplary embodiment, no icon of link data set identifying an application program or a user data set that the user does not wish to be displayed is displayed in either first area A1 or second area A2. Therefore, if the user wishes maintain as confidential use of a particular application program or a particular data set, the user can avoid display of a link data set identifying the particular application program or the particular data set on the screen, and thus prevent the particular application program or particular data set being seen by a third party.

Moreover, as shown in FIG. 10, if first area A1 has plural pages and second area A2 remains on the screen while first area A1 is moved on the screen, the user can quickly select in second area A2 a link data set identifying an application program or a data set used frequently by the user in a recent period, at any time when either a page of first area A1, i.e. first page A11, second page A12, or third page A13, is displayed. Links contained in second area A2 are also contained in any one of first page A11, second page A12 and third page A13 of first area A1, and the links contained in first area A1 cannot be displayed continuously. However, since second area A2 is displayed continuously, the user can select easily a link in second area A2 even when the same link in first area A1 is not displayed.

Information-processing device 100 may perform operations of only one of the first and second exemplary embodiments, and it may perform operations both of the first and second exemplary embodiments. Links of the second exemplary embodiment may include both hyperlinks and soft links. Styles of display of bookmarks and links are not limited to those explained above. In the second exemplary embodiment, similar to the first exemplary embodiment, tiles of icons (displayed names of links) may be edited by the user, and/or positions of icons may be changed by the user.

3. Modifications

The exemplary embodiments explained above may be modified in a variety of ways. Following are some examples of modifications of the exemplary embodiments. Some of the following modifications of the exemplary embodiments may be combined for implementation.

Modification 1

In the exemplary embodiments explained above, counters indicating a status of use of link data sets are used. In this modification counters and evaluation values are determined based on a status of use of data sets identified by link data sets, instead of on a status of use of the link data sets. For example, in this modification when a counter counts a number of times of use of a particular data set of a web page identified by a particular link data set, the counter is incremented when the user accesses the web page without using the link data set as well as when the user accesses the web page by using the link data set. Namely, for example, when the user inputs a URL to the web browser to access the target web page, or when the user uses a hyperlink in any other web page to access the target web page, the counter corresponding to the target web page is also incremented. In this case, link data sets included in the second list are determined based on how many times the user actually accesses the target web page.

Modification 2

In this modification, the first list and the second list are displayed at the same time, while the first list and the second list may be displayed in different styles from each other. In another variant of this modification, the first list and the second list may be displayed on different screens.

Modification 3

In this modification, the user can avoid inclusion in the second list of particular link data sets that are included in the first list, where, for example, a category of link data sets for eliminating particular link data sets that are selected by the user from being registered in the second list is prepared. The category is referred to here as an "elimination category." If the user categorizes a particular link data set in the first list in the elimination category, information-processing device 100 eliminates the particular link data set from candidate link data sets when information-processing device 100 selects link data sets to be included in the second list. According to this modification, the user can register a particular link data set in the first list and prevent the particular link data set from being registered in the second list no matter how frequently the particular link data set is used, by categorizing the particular link data set in the elimination category. Namely, the user can register a particular link data set in the first list, and prevent display of the particular link data set in the second list. A manner in which the user can designate link data sets that should not be displayed in the second list is not limited to the manner explained above, and the manner in which the user can designate the link data sets is limited only in so far that a particular link data set that is designated in accordance with an operation of the user is eliminated from candidate link data sets for display in the second list.

Modification 4

In this modification information-processing device 100 is a handy gaming machine, and a different type of information-processing device such as a stationary gaming machine, a smart phone, a tablet type personal computer, a mobile music player, etc. may be used as information-processing device 100. Moreover, when link data sets registered in the first or second list identify data sets stored in a local storage, information-processing device 100 need not have a communication unit.

In this modification, information-processing device 100 does not have a display unit, and an external display device having a display unit may be connected to information-processing device 100, and display control unit 41 may control display on the external display device. For example, information-processing device 100 may be connected to a TV set, and be used to control display on the TV set. Although in this case information displayed on the screen is potentially more likely to seen by a third party the information-processing device 100 is able to provide to the user a significant advantage.

Modification 5

In this modification while information-processing device 100 is configured as a single device, an information-processing system having plural devices provides a function of displaying the first and second list to the user. In this modification, the information-processing system may have a first device functioning as a main device and a second device functioning as a terminal device directly operated by the user. The first and second devices may communicate with each other via a wired or wireless network, and cooperatively operate to realize the display function. The first device may be a personal computer, a gaming machine for home use, etc. The second device may be a remote controller that wirelessly communicates with the first device, a tablet type personal computer, etc.

The system according to this modification may have a display device having a display unit and a control device that communicates with the display device via a network such as the Internet, and the display device and the control device may cooperatively operate to realize the function for displaying the first and second lists to the user. For example, if link data sets identify web pages, specifying unit 22 and/or second registering unit 23 may be held by the control device such as a server device. In this case, the display device may include first registering unit 21 and transmit a result of registration performed by first registering unit 21, i.e. the first list, to the control device. The control device may include a unit that stores an access log data set indicating logs of access to web pages made by the display device in addition to specifying unit 22 and/or second registering unit 23, so that the control device can specify a status of use of link data sets in the first list based on the access log data set, and determine link data sets that are registered in the second list.

In this modification, a method may be employed for displaying link data sets in the first list and in the second list and executing a particular processing specified by a link data set selected by the user, with a program being used to instruct a computer to execute a series of processing to perform the method, in addition to a device and a system. The program may be recorded in a computer-readable non-transitory storage device such as an optical disk and a semiconductor memory, and the recording memory may be provided to the user. The program also may be downloaded to an information-processing device used by the user via a network such as the Internet.

The foregoing description of the embodiments of the present technology is provided for purposes of illustration and description, and is in no way to be taken as either exhaustive or specifically limitative of the present technology; and it will be obvious to those skilled in the art that a wide range of modifications and variations can be applied to the technology described in the exemplified embodiments, with such embodiments having been chosen merely with a view to providing a clear explanation of the principles of the present technology and its range of practical application, thereby to enable others skilled in the art to understand the technology in the context of a variety of embodiments, which can be adopted in the scope of the technology so as to best suit a contemplated use. The scope of the technology is intended to be defined by the claims that follow and equivalents thereof.

What is claimed is:

1. An information-processing device comprising:
   a first registering unit that registers, in accordance with an operation performed by a user, a link data set to access a specific data set;
   a specifying unit that specifies a status of use of a link data set registered by the first registering unit or a status of use of a specific data set indicated by a link data set registered by the first registering unit;
   a second registering unit that registers at least one of a plurality of link data sets registered by the first registering unit based on a status of use specified by the specifying unit; and
   a display control unit that controls a display unit to:
      display a first list containing a plurality of link data sets registered by the first registering unit and a second list containing one or more link data sets registered by the second registering unit, wherein the first list and the second list are separate from each other, wherein the first list and the second list are displayed in different styles from each other or on different screens from each other, wherein the first list extends beyond a viewable area of a display screen and is scrollable to move different portions of the first list into the viewable area of the display screen, and wherein displaying of the second list is independent of the scrolling of the first list; and display one or more link data sets from the second list as a start page when the user starts a web browser or displays a new page.

2. The information-processing device according to claim 1, wherein link data sets contained in the first list are determined in accordance with operations made by the user, and link data sets contained in the second list are determined by the second registering unit without any operation being performed by the user to select the link data sets.

3. The information-processing device according to claim 1, further comprising:

an access unit that accesses a data set identified by a link data set selected from among link data sets contained in the first list or in the second list in accordance with an operation performed by the user.

4. The information-processing device according to claim 1, wherein the specifying unit specifies at least one of a timing of use of a link data set contained in the first list or a data set identified by a link data set contained in the first list, or a number of times of use of a link data set contained in the first list, or a data set identified by a link data set contained in the first list, and the second registering unit registers link data sets based on at least one of the timing of use specified by the specifying unit and the number of times of use specified by the specifying unit.

5. The information-processing device according to claim 4, wherein the specifying unit determines an evaluation value of a link data set by weighting the number of times of use based on the timing of use of the link data or the data set, and the second registering unit registers link data sets based on the evaluation value determined by the specifying unit.

6. The information-processing device according to claim 5, wherein the second registering unit registers link data sets so that link data sets registered by the second registering unit are displayed in a descending order according to at least one of the timing of use, the number of times of use, and the evaluation value.

7. The information-processing device according to claim 1, further comprising:

a designating unit that designates one or more link data sets registered by the first registering unit in accordance with an operation performed by the user;

wherein the second registering unit registers link data sets from among link data sets that are registered by the first registering unit and that are not designated by the designating unit.

8. The information-processing device according to claim 1, wherein link data sets registered by the first registering unit or the second registering unit are data sets indicating hyperlinks.

9. The information-processing device according to claim 1, wherein link data sets registered by the first registering unit or the second registering unit are data sets indicating soft links.

10. A computer-readable non-transitory storage medium storing a program causing a computer to execute operations comprising:

registering in a first list, in accordance with an operation made by a user, a plurality of link data sets each of which indicates a specific data set;

specifying a status of use of each of the registered link data sets or a status of use of each of the specific data sets indicated by the registered link data sets;

registering, in a second list separate from the first list, one or more of the registered link data sets as selected link data sets based on the specified statuses;

displaying the registered link data sets and the selected link data sets, wherein the registered link data sets and the selected link data sets are displayed in different styles from each other or on different screens from each other, wherein the first list extends beyond a viewable area of a display screen and is scrollable to move different portions of the first list into the viewable area of the display screen, and wherein displaying of the second list is independent of the scrolling of the first list;

executing, when a link data set is selected from the displayed link data sets in accordance with an operation made by the user, a processing identified by the link data set selected in accordance with an operation made by the user; and displaying of one or more link data sets from the second list as a start page when a web browser is started or when a new page is displayed.

11. An information-processing system comprising at least one processor configured to:

register in a first list, in accordance with an operation performed by a user, a plurality of link data sets each of which indicates a specific data set;

specify a status of use of each of the registered link data sets or a status of use of each of the specific data sets indicated by the registered link data sets;

further register, in a second list separate from the first list, one or more of the registered link data sets based on the specified statuses;

display the registered link data sets;

display the further registered link data sets, wherein the registered link data sets extend beyond a viewable area of a display screen and is scrollable to move different portions of the registered link data sets into the viewable area of the display screen, and wherein displaying of the further registered link data sets is independent of the scrolling of the registered link data sets;

when a link data set is selected from the displayed link data sets in accordance with an operation performed by the user, executes a processing identified by the selected link data set; and when a web browser is started or when a new page is displayed, display one or more further registered link data sets from the second list as a start page.

12. An information-processing method comprising:

Registering in a first list, in accordance with an operation made by a user, link data sets each of which indicates a specific data set;

specifying a status of use of each of the registered link data sets or a status of use of each of the specific data sets indicated by the registered link data sets;

registering, in a second list separate from the first list, one or more of the registered link data sets as selected link data sets based on the specified statuses;

displaying the registered link data sets and the selected link data sets, wherein the registered link data sets and the selected link data sets are displayed in different styles from each other or on different screens from each other, wherein the registered link data sets extends beyond a viewable area of a display screen and is scrollable to move different portions of the registered link data sets into the viewable area of the display screen, and wherein displaying of the selected link data sets is independent of the scrolling of the registered link data sets;

executing, when a link data set is selected from the displayed link data sets in accordance with an operation made by the user, a processing identified by the link data set selected in accordance with an operation performed by the user; and displaying one or more selected link data sets from the second list as a start page when the user starts a web browser or displays a new page.

13. The information processing device according to claim 1, wherein the display control unit controls the display unit to display the first list and the second list in different styles from each other.

14. The information processing device according to claim 1, wherein the display control unit controls the display unit to display the first list and the second list on different screens from each other.

15. The information processing system according to claim 11, wherein when the web browser is started, the one or more further registered link data sets are displayed as the start page without requiring the user to perform an operation for displaying the one or more further registered link data sets after a start page is displayed.

16. The information processing system according to claim 11, wherein when the web browser is started, the one or more further registered link data sets are automatically displayed as the start page.

17. The information processing device according to claim 1, wherein when the web browser is started, the one or more link data sets from the second list are displayed as the start page without requiring the user to perform an operation for displaying link data sets after a start page is displayed.

18. The information-processing device according to claim 1, wherein the second list is displayed without changing its position in the display screen during the scrolling of the first list.

19. The information processing device according to claim 1, wherein link data sets of the first list are arranged in a plurality of pages such that the first list is scrollable by the user to display a selected one of the pages on the display screen at a particular time, and wherein the second list is displayed unchanged on the display screen at the particular time irrespective of which of the pages of the first list is displayed at the particular time.

* * * * *